United States Patent [19]

Wuest et al.

[11] Patent Number: 4,908,133
[45] Date of Patent: Mar. 13, 1990

[54] PROCESS FOR WORKING UP AQUEOUS ELECTROLYTE-CONTAINING SUSPENSIONS OF HIGHLY SWELLABLE LAYER SILICATES

[75] Inventors: Willi Wuest, Ratingen; Norbert Kuehne, Haan, both of Fed. Rep. of Germany

[73] Assignee: Henkel Kommanditgesellschaft auf Aktien, Duesseldorf, Fed. Rep. of Germany

[21] Appl. No.: 343,467

[22] Filed: Apr. 26, 1989

[30] Foreign Application Priority Data

Apr. 30, 1988 [DE] Fed. Rep. of Germany ....... 3815008

[51] Int. Cl.$^4$ ............................................. B01D 13/00
[52] U.S. Cl. ..................................... 210/641; 210/651; 210/652

[58] Field of Search ............... 210/634, 637, 641, 644, 210/648, 649, 650, 651, 652; 204/182.2

[56] References Cited

U.S. PATENT DOCUMENTS 4,279,879 7/1981 Winyall et al. ................... 204/182.2

Primary Examiner—Frank Sever
Attorney, Agent, or Firm—Ernest G. Szoke; Wayne C. Jaeschke; John E. Drach

[57] ABSTRACT

A process for working up aqueous, electrolyte-containing suspensions of highly swellable layer silicates by which highly swellable layer silicates are isolated substantially free from electrolyte from an aqueous electrolyte-containing suspension in a reasonable time by multi-stage membrane filtration wherein the second and every following membrane stage, the concentrate is diluted, for example with fully deionized water, to maintain pumpability.

11 Claims, 2 Drawing Sheets

PROCESS FOR WORKING UP AQUEOUS ELECTROLYTE-CONTAINING SUSPENSIONS OF HIGHLY SWELLABLE LAYER SILICATES

BACKGROUND OF THE INVENTION

1. Field of the Invention

This invention relates to a process for working up aqueous electrolyte-containing suspensions of highly swellable layer silicates.

2. Description of the Related Art

Processes for working up highly swellable layer silicates, such as hectorites, are known. In these processes, the layer silicates are supposed to be isolated and separated off from the starting suspension in electrolyte-free form.

In known processes, the mother liquor is first separated off by filtration in filter presses, particularly membrane filter presses. The layer silicates remain in the filter cake as a gel-like mass together with part of the adhering mother liquor of high electrolyte content. In order to isolate the layer silicates from the filter cake in electrolyte-free form, it is standard practice to wash out the filter cake with water. However, under the effect of the electrolytes still present, the layer silicates begin to swell considerably, clogging the pores of the filter medium so that filtration becomes very difficult or even impossible. Because of these difficulties, the layer silicates can only be worked by a very laborious and complicated filtration and washing process.

SUMMARY OF THE INVENTION

It is an object of the present invention to provide a process by which highly swellable layer silicates can be isolated substantially free from electrolyte from an aqueous electrolyte-containing suspension in a reasonable time. According to the invention, this object is achieved by a continuous multistage membrane filtration process for working up an aqueous electrolyte-containing suspension of highly swellable layer silicates comprising the steps of (1) passing said suspension through a membrane filtration stage to from a retentate composed of said concentrate wherein said concentrate contains said highly swellable layer silicate and a portion of said electrolyte, the remaining portion of said electrolyte being present in said permeate; (2) diluting said concentrate with deionized water to form a slurry, and (3) recycling said slurry to step (1) and (2) and continuing said recycling until an electrolyte-free layer silicate suspension is produced.

DESCRIPTION OF THE PREFERRED EMBODIMENTS

Figure 1:
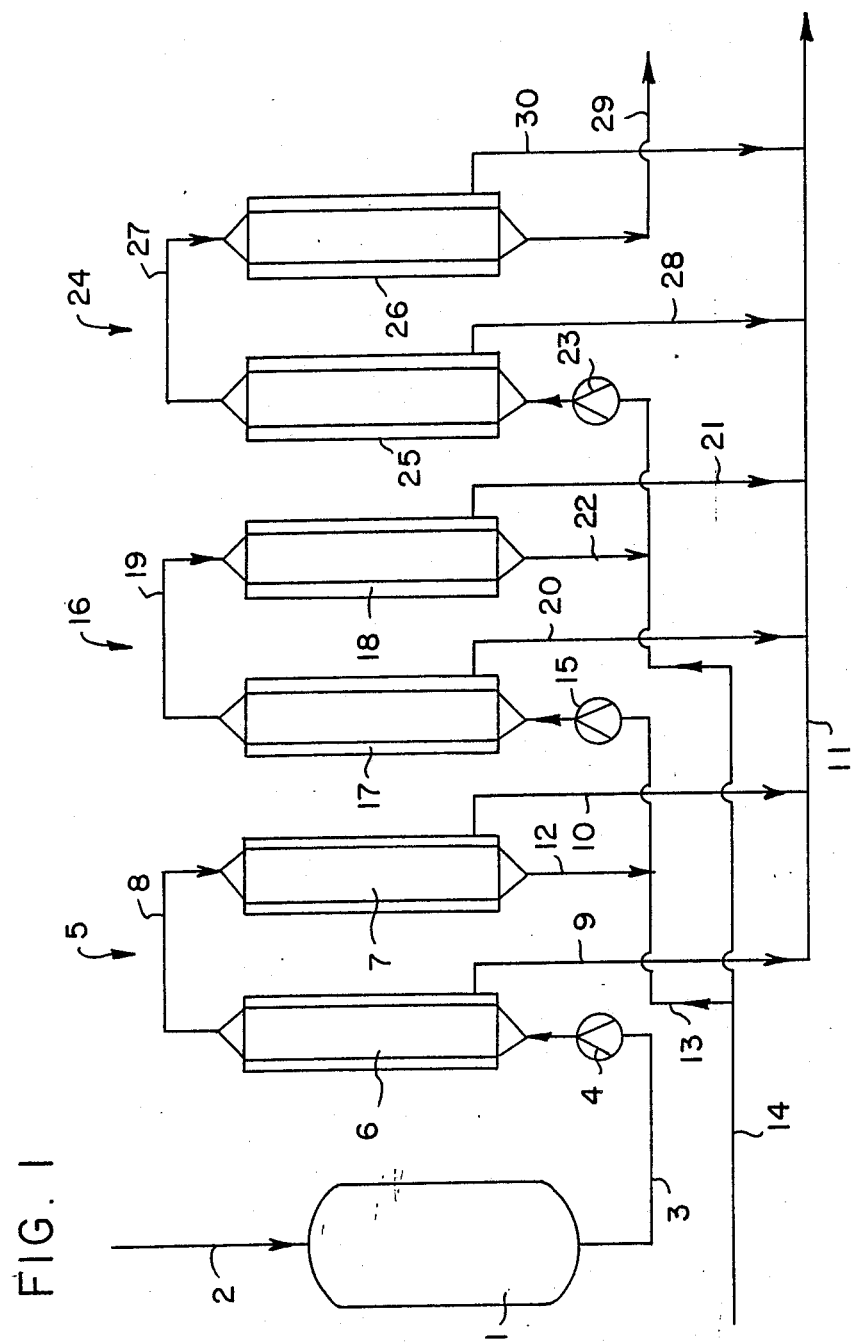
FIG. 1 illustrates a simplified flow chart of a continuous membrane filtration process.

It has surprisingly been found that the layer silicates can be isolated from the starting suspension almost completely free from electrolyte by membrane filtration. In the membrane filtration the layer silicates are isolated in the retentate with a portion of the electrolyte passing through the membrane in an aqueous solution in the permeate. By virtue of the considerably smaller pore diameter of the membranes compared with the mean diameter of the swollen layer silicates, the concentrate cannot settle over the pores as in filter presses, so that electrolyte-containing permeate can pass through the pores at any time. As in standard membrane processes, the filtration time is negligible compared with the time required for working up in filter presses.

In a preferred embodiment of the invention, the process can be operated in a continuous manner wherein the starting suspension is continuously delivered to the successive membrane stages. In this continuous procedure, the layer silicates worked up may be aftertreated or processed as required without interruption.

The process may also be operated in a batch-wise manner wherein the starting suspension may be delivered discontinuously from a storage container to one or more membrane stages connected in parallel, the concentrate from the individual stages may be collected in a collecting container and diluted therein with fully deionized water and the diluted concentrate may then be subjected to further purifications in the membrane stages with recycling and dilution in each stage. This variant of the process is particularly suitable when the layer silicates worked up are to be subsequently processed after a time interval or in batches.

In one particularly practical embodiment, each membrane stage is formed by a plurality of membrane modules arranged one behind the other. This arrangement of several modules in series provides for adequate filtration.

In one particularly favorable embodiment, the membrane filtration is carried out at crossflow rates of from 3 to 6 m/s and preferably at crossflow rates of from 4 to 4.5 m/s.

In another embodiment of the invention, the membrane filtration is carried out at temperatures in the range from 20° to 200° C. and preferably at temperatures in the range from 80° to 140° C. The exact temperature to be established depends on the properties of the layer silicates to be worked up.

In a further embodiment of the invention, the membrane filtration is carried out under pressures on the permeate side of the order of 16 bar on entry into each membrane stage. A pressure such as this provides for optimal filtration.

In one particularly advantageous embodiment of the invention, the membrane filtration is carried out under pressures on the permeate side above the particular steam pressure. Carrying out the process in this way ensures that, at temperatures above 100° C. on the permeate side, no evaporation of water can occur to the detriment of filtration.

In another embodiment of the invention, the starting suspension is filtered in a filter press before working up by membrane filtration. Most of the mother liquor of the starting suspension is separated off in this filter press before working up actually begins.

Finally, in a further embodiment of the invention, the electrolyte-free suspension is dried by spray drying after membrane filtration.

Referring to FIG. 1 which illustrates a simplified flow chart of a continuous membrane filtration process, the process encompasses a storage container 1 to which an aqueous electrolyte-containing suspension of highly swellable layer silicates is delivered through a pipe 2. A pipe 3 in which a pump 4 is arranged leads off from the storage container 1. The pipe 3 opens into a first membrane stage 5 consisting of two modules 6 and 7 arranged one behind the other, the concentrate from the module 6 being delivered to the module 7 through a pipe 8.

The permeate from the modules 6 and 7 is run off through two permeate pipes 9 and 10 into a central permeate pipe 11. Arranged where the concentrate (retentate) leaves the module 7 of the first stage 5 is a concentrate pipe 12 into which opens a pipe 13 branching off from a central water pipe 14 through which fully deionized water is delivered.

The pipe 12 leads through a pump 15 into a second membrane stage 16 consisting of two modules 17 and 18 arranged one behind the other. A concentrate pipe 19 and a permeate pipe 20, which opens into the central permeate pipe 11, lead off from the module 17. A pipe 21 is connected on the permeate side of the module 18 and a pipe 22 on the concentrate side. The central water pipe 14 opens into the pipe 22.

The pipe 22 leads through a pump 23 into a third membrane stage 24 formed by two modules 25 and 26. Arranged on the module 25 are a concentrate pipe 27, which opens into the module 26, and a permeate pipe 28 which leads into the central permeate pipe 11. A product pipe 29 leads off from the module 26 on the concentrate side while a pipe 30 which opens into the central permeate pipe 11 leads off therefrom on the permeate side.

The aqueous, electrolyte-containing starting suspension of highly swellable layer silicates is continuously delivered to the first membrane stage 5 from the storage container 1 through the pipe 3 and the pump 4. In the first module 6, part of the aqueous electrolyte is filtered off and removed through the permeate pipe 9. The concentrated layer silicates then pass through the concentrate pipe 8 into the second module 7 where they are further concentrated, aqueous electrolyte being filtered off as permeate and removed through the pipe 10. The still just pumpable concentrate with an already distinctly reduced electrolyte content is then diluted with fully deionized water from the pipe 13 to improve its pumpability and is delivered by the pump 15 into the second membrane stage 16.

In the modules 17 and 18 of the second membrane stage 16, the electrolyte-containing permeate filtered off is again removed through the permeate pipes 20 and 21. The still pumpable concentrate of the module 18 already has a very low electrolyte content at this stage. However, to achieve complete removal of the electrolyte, the concentrate containing the layer silicates is delivered to a third membrane stage 24. The concentrate issuing from the second membrane stage 16 through the pipe 22 is first mixed with fully deionized water through the pipe 14 to improve its pumpability and is delivered by the pump 23 into the membrane stage 24. The layer silicates are then further worked up in the modules 25 and 26. Residual electrolyte is removed from the modules 25 and 26 on the permeate side through the pipes 28 and 30. The concentrate issuing from the module 26 through the pipe 29 now consists of a completely electrolyte-free layer silicate suspension. This electrolyte-free suspension may then be delivered through the pipe 29 to a drying stage or the like although this is not shown in the drawing.

If the filtration in the membrane stages 5, 16 and 24 is carried out at a temperature above 100° C., it is possible in accordance with the invention to apply a pressure above the corresponding steam pressure on the permeate side, although this is not shown in the drawing. This measure prevents water-containing permeate from evaporating which would adversely affect filtration.

Figure 2:
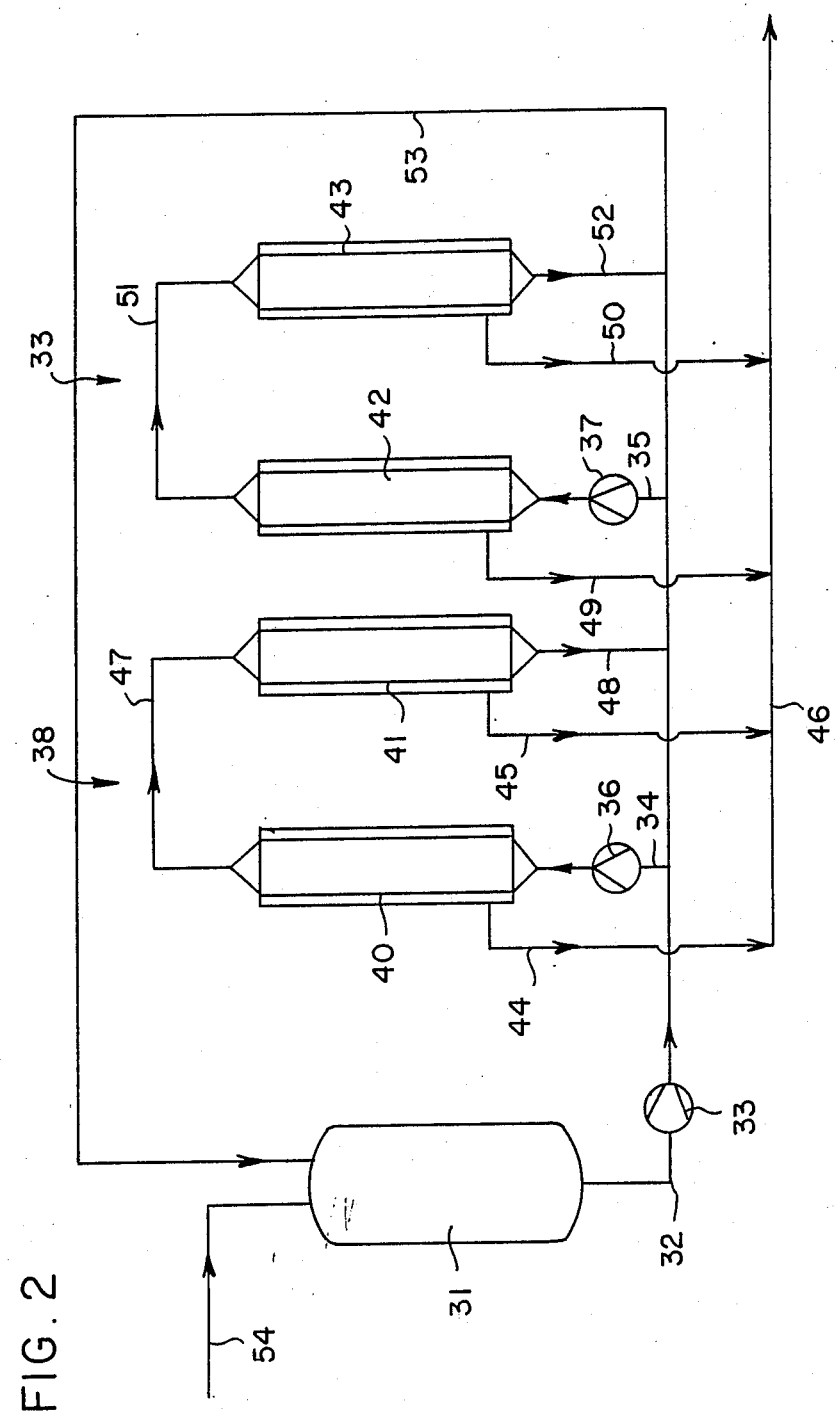
FIG. 2 illustrates a simplified flow chart of a discontinuous or batch-wise membrane filtration process.

A discontinuous or batch-wise membrane filtration plant is shown in FIG. 2. A storage vessel 31 for holding the electrolyte-containing starting suspension of highly swellable layer silicates comprises an outlet pipe 32 in which a pump 33 is arranged. Two parallel branch pipes 34 and 35 with pumps 36 and 37 lead off from the pipe The branch pipes 34 and 35 open into two membrane stages 38 and 39 connected in parallel which each consist of two modules 40,41 and 42,43 arranged one behind the other. A permeate pipe 44 leads off from the first module 40 of the first membrane stage 38 while another permeate pipe 45 leads off from the second module 41, the two permeate pipes 44 and 45 opening into the central permeate pipe 46. The concentrate of the module 40 passes through a concentrate pipe 47 into the second module 41 of which the concentrate issues through a pipe 48.

The second membrane stage 39 comprises a permeate pipe 49 on the first module 42 and a permeate pipe 50 on the second module 43. The concentrate of the module 42 passes through a pipe 51 into the second module 43 of which the concentrate enters the pipe 32 through a pipe 52.

After the opening of the pipe 52, the pipe 32 assumes the form of a return pipe 53 and opens into the storage container 31. In addition, the storage container 31 has a feed pipe 54 for fully deionized water.

The aqueous, electrolyte-containing starting suspension of highly swellable layer silicates is delivered from the storage container 31 through the pipe 32 by the pump 33, the pump 33 being switched off after emptying of the container 31. The starting suspension is then pumped through the branch pipes 34 and 35 and the pumps 36 and 37 into the parallel membrane stage 38 and 39. The suspension is first concentrated in the first module 40, 42 of which the aqueous electrolyte-containing permeate is removed through the pipes 44 and 49 into the central permeate pipe 46. The layer silicates in the concentrate are passed through the pipes 47 and 51 into the second modules 42 and 43 and further concentrated therein. The electrolyte-containing permeate issues through the permeate pipes 45 and 50 while the concentrate containing the layer silicates is removed through the pipes 48 and 52 and delivered to the return pipe 53. The still pumpable, concentrated suspension then passes through the return pipe 53 back into the storage container 31 which now serves as a collecting container.

Fully deionized water is passed through the pipe 54 into the storage or collecting container 31 and mixed with the suspension. The suspension is thus diluted so that its pumpability is improved. The pump 33 is then restarted and the suspension further worked up in the membrane stages 38 and 39 so that more and more electrolyte is separated as permeate. The concentrate from this working up operation is again returned to the collecting container 31 through the return pipe 53.

This process is repeated until the electrolyte content of the suspension in the collecting container 31 is negligible. The worked-up suspension may then be removed from the collecting container 31 and further processed. The storage or collecting container 31 thus emptied may then be filled with another electrolyte-containing starting suspension.

The invention is not of course confined to the embodiments illustrated by way of example in the drawings and may be further modified without departing from the basic scope. Thus, a membrane stage may also be formed by more than two modules arranged one behind the other. In addition, the number of membrane stages used may be adapted to the particular application.

What is claimed is:

1. A continuous multistage membrane filtration process comprising working up an aqueous electrolyte-containing suspension of highly swellable layer silicates by (1) passing said suspension through a membrane filtration stage to from a retentate composed of said concentrate wherein said concentrate contains said highly swellable layer silicate and a portion of said electrolyte, the remaining portion of said electrolyte being present in said permeate; (2) diluting said concentrate with completely deionized water to form a slurry, and (3) recycling said slurry to step (1) and (2) and continuing said recycling until an electrolyte-free layer silicate suspension is produced.

2. The process of claim 1 wherein when said process is operated batch-wise, said retentate is isolated after one or more filtration operations of step (1) before undergoing steps (2) and (3).

3. The process of claims 1 or 2 wherein said membrane filtration stage comprises a plurality of membrane modules arranged in series.

4. The process of claim 1 wherein said membrane filtration stage is operated at a crossflow rate of from about 3 to about 6 m/s.

5. The process of claim 1 wherein said membrane filtration stage is operated at a crossflow rate of from about 4 to about 4.5 m/s.

6. The process of claim 1 wherein said membrane filtration stage is operated at a temperature of from about 20° to about 200° C.

7. The process of claim 1 wherein said membrane filtration stage is operated at a temperature of from about 80° to about 140° C.

8. The process of claim 1 wherein the pressure on the retentate side of said membrane filtration stage is about 16 bar on the entry side.

9. The process of claim 1 wherein when said membrane filtration stage is operated at a temperature above 100° C., the pressure on said permeate side is above the corresponding steam pressure at said temperature above 100° C.

10. The process of claim 1 wherein said starting suspension is filtered in a filter press prior to step (1).

11. The process of claim 1 wherein an electrolyte-free layer silicate is recovered by spray drying said electrolyte-free layer silicate suspension.

* * * * *